United States Patent
Hu

(10) Patent No.: US 9,980,242 B2
(45) Date of Patent: *May 22, 2018

(54) AIR-INTERFACE-BASED SYNCHRONIZATION METHOD, BASE STATION, CONTROL APPARATUS, AND WIRELESS COMMUNICATIONS SYSTEM

(71) Applicant: Huawei Technologies Co., Ltd., Shenzhen (CN)

(72) Inventor: Jun Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

This patent is subject to a terminal disclaimer.

(21) Appl. No.: 14/983,208

(22) Filed: Dec. 29, 2015

(65) Prior Publication Data

US 2016/0135138 A1    May 12, 2016

Related U.S. Application Data

(63) Continuation of application No. PCT/CN2013/078580, filed on Jul. 1, 2013.

(51) Int. Cl.
*H04W 56/00* (2009.01)
*H04B 7/26* (2006.01)
(Continued)

(52) U.S. Cl.
CPC ...... *H04W 56/0015* (2013.01); *H04B 7/2696* (2013.01); *H04W 56/0055* (2013.01); *H04W 88/08* (2013.01); *H04W 88/12* (2013.01)

(58) Field of Classification Search
None
See application file for complete search history.

(56) References Cited

U.S. PATENT DOCUMENTS

| 6,775,242 B2 | 8/2004 | Grilli et al. |
| 2001/0022779 A1 | 9/2001 | Wheatley et al. |

(Continued)

FOREIGN PATENT DOCUMENTS

| CN | 1554159 A | 12/2004 |
| CN | 1710828 A | 12/2005 |

(Continued)

OTHER PUBLICATIONS

"$3^{rd}$ Generation Partnership Project; Technical Specification Group Radio Access Network; Evolved Universal Terrestrial Radio Access (E-UTRA); Requirements for support of radio resource management (Release 11)," 3GPP TS 36.133, V11.4.0, pp. 1-334,$3^{rd}$ Generation Partnership Project, Valbonne, France (Mar. 2013).

(Continued)

*Primary Examiner* — Gary Mui
(74) *Attorney, Agent, or Firm* — Leydig, Voit & Mayer, Ltd.

(57) ABSTRACT

The present disclosure discloses an air-interface-based synchronization method, a base station and its control apparatus, and a wireless communications system. By taking advantage of active random access of user equipment, a time difference between base stations is acquired by detecting a random access preamble, and a time adjustment value of a non-reference base station is acquired according to the acquired time difference and reference time of a reference base station; and the non-reference base station performs time adjustment according to the acquired time adjustment value, to complete time synchronization with the reference base station. The present disclosure can easily and effectively implement air-interface-based synchronization between base stations by using an existing wireless network, thereby achieving a technical effect in a convenient and economic manner.

15 Claims, 11 Drawing Sheets

(51) Int. Cl.
*H04W 88/08* (2009.01)
*H04W 88/12* (2009.01)

(56) References Cited

U.S. PATENT DOCUMENTS

| | | |
|---|---|---|
| 2003/0007470 A1 | 1/2003 | Grilli et al. |
| 2008/0084849 A1 | 4/2008 | Wang et al. |
| 2008/0144668 A1 | 6/2008 | Hall et al. |
| 2012/0170570 A1* | 7/2012 | Chang ............... H04W 56/005 370/350 |
| 2013/0003682 A1* | 1/2013 | Jiang ............... H04W 56/0045 370/329 |
| 2013/0070726 A1* | 3/2013 | Zhang ............... H04W 56/0035 370/331 |
| 2013/0265992 A1 | 10/2013 | Deng et al. |
| 2014/0328309 A1* | 11/2014 | Comstock ........... H04W 72/082 370/329 |
| 2014/0348138 A1* | 11/2014 | Ono .................... H04W 56/001 370/336 |
| 2015/0327218 A1* | 11/2015 | Kim .................... H04W 74/08 370/329 |

FOREIGN PATENT DOCUMENTS

| | | |
|---|---|---|
| CN | 101035327 A | 9/2007 |
| CN | 101400079 A | 4/2009 |
| CN | 101801121 A | 8/2010 |
| CN | 102196479 A | 9/2011 |
| CN | 102547961 A | 7/2012 |
| CN | 102970741 A | 3/2013 |
| EP | 2249616 * | 1/2009 |
| EP | 2106157 A1 | 9/2009 |
| EP | 2536228 A1 | 12/2012 |
| JP | 2003531552 A | 10/2003 |
| JP | 2004535728 A | 11/2004 |
| JP | 2009284481 A | 12/2009 |
| KR | 100945699 B1 | 3/2010 |
| WO | WO 0180461 A1 | 10/2001 |
| WO | 03007508 A1 | 1/2003 |
| WO | WO 2012075940 A1 | 6/2012 |
| WO | 2012169840 A2 | 12/2012 |
| WO | 2013039435 A1 | 3/2013 |
| WO | WO 2013096616 A1 | 6/2013 |

OTHER PUBLICATIONS

Cox, "Handover in RRC_CONNECTED," An Introduction to LTE: LTE, LTE-Advanced, SAE and 4G Mobile Communications Section 14.4, John Wiley & Sons (2012).

"LTE; Evolved Universal Terrestrial Radio Access (E-UTRA); Requirements for support of radio resource management (3GPP TS 36.133 version 11.4.0 Release 11)," ETSI TS 136.133, V11.4.0, pp. 1-677, European Telecommunications Standards Institute, Sophia-Antipolis, France (Apr. 2013).

"3$^{rd}$ Generation Partnership Project; Technical Specification Group Radio Access Network; Evolved Universal Terrestrial Radio Access (E-UTRA); Physical Channels and Modulation (Release 11)," 3GPP TS 36.211, V11.3.0, pp. 1-108, 3$^{rd}$ Generation Partnership Project, Valbonne, France (Jun. 2013).

"3$^{rd}$ Generation Partnership Project; Technical Specification Group Radio Access Network; Evolved Universal terrestrial Radio Access (E-UTRA); Physical Layer procedures (Release 11)," 3GPP TS 36.213, V11.3.0, pp. 1-176, 3$^{rd}$ Generation Partnership Project, Valbonne, France (Jun. 2013).

"3$^{rd}$ Generation Partnership Project; Technical Specification Group Radio Access Network; Evolved Universal Terrestrial Radio Access (E-UTRA); Physical later; Measurements (Release 11)," 3GPP TS 36.214, V11.1.0, pp. 1-14, 3$^{rd}$ Generation Partnership Project, Valbonne, France (Dec. 2012).

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.5.0, pp. 1-209, 3$^{rd}$ Generation Project, Valbonne, France (Mar. 2013).

"3$^{rd}$ Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.3.0, pp. 1-344, 3$^{rd}$ Generation Partnership Project, Valbonne, France (Mar. 2013).

\* cited by examiner

US 9,980,242 B2

AIR-INTERFACE-BASED SYNCHRONIZATION METHOD, BASE STATION, CONTROL APPARATUS, AND WIRELESS COMMUNICATIONS SYSTEM

CROSS-REFERENCE TO RELATED APPLICATIONS

This application is a continuation of International Patent Application No. PCT/CN2013/078580, filed on Jul. 1, 2013, which is hereby incorporated by reference in its entirety.

TECHNICAL FIELD

The present disclosure relates to the field of wireless communications, and in particular, to an air-interface-based synchronization method, a base station, a control apparatus, and a wireless communications system.

BACKGROUND

With increasing requirements for wireless network capacity, to obtain higher network capacity, sites are deployed more densely. For a Long Term Evolution (LTE) system, regardless of a homogeneous network (HomNet) or a heterogeneous network (HetNet), because sites are deployed more densely, interference between cells is more severe. As a result, a throughput of users on a border of the cells decreases, and the normal work of edge users is affected in a severe case. Staggering resources of the edge users can resolve the interference problem between the cells. The conventional method is using inter-cell time domain interference coordination. With the help of coordination of the use of subframes between different cells, staggering of interference between the cells is implemented. This is specifically implemented by using an almost blank subframes (ABS) technology. An ABS subframe sends no data at all, and transmits only a reference signal. Some subframes for an interfering cell are set as ABS subframes, and an interfered-with cell is hardly interfered with in the corresponding subframes.

A prerequisite of implementing the inter-cell time domain interference coordination is time synchronization between cells. A general method is performing the time synchronization between the cells by using a global positioning system (GPS), which requires that GPS be configured for each site. The GPS-based synchronization technology is referred to as a hard synchronization technology. Performing the time synchronization by using the GPS has problems of high construction costs and high maintenance costs.

SUMMARY

Embodiments of the present disclosure provide a processing method for implementing air-interface-based time synchronization between base stations, an apparatus, and a wireless communications system, so as to resolve problems of high construction costs and high maintenance costs in the prior-art method of performing time synchronization between base stations by using GPS.

The embodiments of the present disclosure may be specifically implemented by using the following technical solutions:

According to a first aspect, a central controller apparatus is provided, where the apparatus includes:

a time adjustment value processing unit, configured to acquire at least one time difference, and acquire a time adjustment value of a second base station according to the at least one time difference and reference time of a first base station, where the time difference is a time difference between the first base station and the second base station, the at least one time difference includes the first time difference, and the first time difference is a time difference that is between the first base station and the second base station and acquired by using active random access of first user equipment UE, where the first base station is a reference base station, and the second base station is a non-reference base station; and an adjustment value sending unit, configured to send the time adjustment value acquired by the time adjustment value processing unit to the second base station, so that the second base station performs time adjustment according to the time adjustment value.

A central controller processing method in air-interface-based synchronization is further provided, where the method includes:

acquiring, by a central controller, at least one time difference, and acquiring a time adjustment value of a second base station according to the at least one time difference and reference time of a first base station, where the time difference is a time difference between the first base station and the second base station, the at least one time difference includes the first time difference, and the first time difference is a time difference that is between the first base station and the second base station and acquired by using active random access of first user equipment UE, where the first base station is a reference base station, and the second base station is a non-reference base station; and sending, by the central controller, the time adjustment value to the second base station, so that the second base station performs time adjustment according to the time adjustment value.

A central controller apparatus is further provided, where the apparatus includes:

a processor, a memory, and an interface, where the interface is configured to perform information exchange with a base station; and the memory is configured to store program code, and the processor invokes the program code stored in the memory, so as to execute the central controller processing method in the air-interface-based synchronization.

According to a second aspect, a first base station apparatus is provided, where the apparatus includes:

a user selection unit, configured to select first user equipment UE after receiving a time difference request message sent by a central controller;

a time difference calculation unit, configured to acquire, according to the first UE selected by the user selection unit, a first time difference between the first base station and a second base station by using active random access of the first UE; and a time difference sending unit, configured to send the first time difference acquired by the time difference calculation unit to the central controller, so that the central controller acquires a time adjustment value of the second base station according to at least one time difference that is acquired and reference time of the first base station, where the at least one time difference includes the first time difference, the first base station is a reference base station, and the second base station is a non-reference base station.

A first base station processing method in air-interface-based synchronization is further provided, where the method includes:

selecting, by a first base station, first user equipment UE after receiving a time difference request message sent by a central controller;

acquiring, by the first base station, a first time difference between the first base station and a second base station by using active random access of the first UE; and sending, by the first base station, the first time difference to the central controller, so that the central controller acquires a time adjustment value of the second base station according to at least one time difference that is acquired and reference time of the first base station, where the at least one time difference includes the first time difference, the first base station is a reference base station, and the second base station is a non-reference base station.

A first base station apparatus is further provided, where the apparatus includes:

a processor, a memory, a transceiver, and an interface, where the interface is configured for information exchange between base stations or information exchange between a base station and a core network, or configured for information exchange with a central controller;

the transceiver is configured to exchange information with user equipment; and the memory is configured to store program code, and the processor invokes the program code stored in the memory, to execute the first base station processing method in air-interface-based synchronization.

According to a third aspect, a second base station apparatus is provided, where the apparatus includes:

an adjustment value acquiring unit, configured to receive a time adjustment value sent by a central controller, where the time adjustment value is a time adjustment value of the second base station acquired by the central controller according to at least one time difference between a first base station and the second base station and reference time of the first base station, the at least one time difference includes a first time difference, and the first time difference is a time difference acquired by the first base station according to a time difference request message and by using active random access of first user equipment UE; and a time adjustment unit, configured to perform time adjustment according to the time adjustment value acquired by the adjustment value acquiring unit.

A second base station processing method in air-interface-based synchronization is further provided, where the method includes:

receiving, by a second base station, a time adjustment value sent by a central controller, where the time adjustment value is a time adjustment value of the second base station acquired by the central controller according to at least one time difference between a first base station and the second base station and reference time of the first base station, the at least one time difference includes a first time difference, and the first time difference is a time difference acquired by the first base station according to a time difference request message and by using active random access of first user equipment UE; and performing, by the second base station, time adjustment according to the time adjustment value.

A second base station apparatus is further provided, where the apparatus includes:

a processor, a memory, a transceiver, and an interface, where the interface is configured for information exchange between base stations or information exchange between a base station and a core network, or configured for information exchange with a central controller;

the transceiver is configured to exchange information with user equipment; and the memory is configured to store program code, and the processor invokes the program code stored in the memory, to execute the second base station processing method in air-interface-based synchronization.

According to a fourth aspect, a first base station apparatus is provided, where the apparatus includes:

a user selection unit, configured to select first user equipment UE after receiving a time difference request message sent by a second base station;

a time difference calculation unit, configured to acquire, according to the first UE selected by the user selection unit, a first time difference between the first base station and a second base station by using active random access of the first UE; and a time difference sending unit, configured to send the first time difference acquired by the time difference calculation unit to the second base station, so that the second base station acquires a time adjustment value of a non-reference base station according to at least one time difference that is acquired and reference time of a reference base station, where the at least one time difference includes the first time difference, and the reference base station is the first base station and the non-reference base station is the second base station, or the reference base station is the second base station and the non-reference base station is the first base station.

A first base station processing method in air-interface-based synchronization is further provided, where the method includes:

selecting, by a first base station, first user equipment UE after receiving a time difference request message sent by a second base station;

acquiring, by the first base station, a first time difference between the first base station and the second base station by using active random access of the first UE; and sending, by the first base station, the first time difference to the second base station, so that the second base station acquires a time adjustment value of a non-reference base station according to at least one time difference that is acquired and reference time of a reference base station, where the at least one time difference includes the first time difference, and the first base station is the reference base station and the second base station is the non-reference base station, or the second base station is the reference base station and the first base station is the non-reference base station.

A first base station apparatus is further provided, where the apparatus includes:

a processor, a memory, a transceiver, and an interface, where the interface is configured for information exchange between base stations or information exchange between a base station and a core network;

the transceiver is configured to exchange information with user equipment; and the memory is configured to store program code, and the processor invokes the program code stored in the memory, to execute the first base station processing method in air-interface-based synchronization.

According to a fifth aspect, a second base station apparatus is provided, where the apparatus includes:

a time difference request unit, configured to send a time difference request message to a first base station, so that the first base station acquires a first time difference between the first base station and the second base station by using active random access of first user equipment UE;

a time adjustment value processing unit, configured to acquire at least one time difference, and acquire a time adjustment value of a non-reference base station according to the at least one time difference and reference time of a reference base station, where the time difference is a time difference between the first base station and the second base station, and the at least one time difference includes a first time difference, where the reference base station is the first base station and the non-reference base station is the second base station, or the reference base station is the second base station and the non-reference base station is the first base station; and an adjustment value sending unit, configured to send the time adjustment value acquired by the time adjustment value processing unit to the non-reference base station, so that the non-reference base station performs time adjustment according to the time adjustment value.

A second base station processing method in air-interface-based synchronization is further provided, where the method includes:

sending, by a second base station, a time difference request message to a first base station, so that the first base station acquires a first time difference between the first base station and the second base station by using active random access of first user equipment UE;

acquiring, by the second base station, at least one time difference, and acquiring a time adjustment value of a non-reference base station according to the at least one time difference and reference time of a reference base station, where the time difference is a time difference between the first base station and the second base station, and the at least one time difference includes the first time difference, where the first base station is the reference base station and the second base station is the non-reference base station, or the second base station is the reference base station and the first base station is the non-reference base station; and sending, by the second base station, the time adjustment value to the non-reference base station, so that the non-reference base station performs time adjustment according to the time adjustment value.

A second base station apparatus is further provided, where the apparatus includes:

a processor, a memory, a transceiver, and an interface, where the interface is configured for information exchange between base stations or information exchange between a base station and a core network;

the transceiver is configured to exchange information with user equipment; and the memory is configured to store program code, and the processor invokes the program code stored in the memory, to execute the second base station processing method in air-interface-based synchronization.

As can be seen from the foregoing embodiment description, according to the implementation manners of the present disclosure, a time difference between base stations can be acquired by means of signaling interaction by using active random access of a user equipment, and a time adjustment value of a non-reference base station is acquired according to a reference time of a reference base station, so that the non-reference base station performs time adjustment according to the time adjustment value, to implement time synchronization between the non-reference base station and the reference base station, without a need of using an expensive synchronization device, thereby reducing construction and maintenance costs, and achieving a technical effect in an economic and convenient manner.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
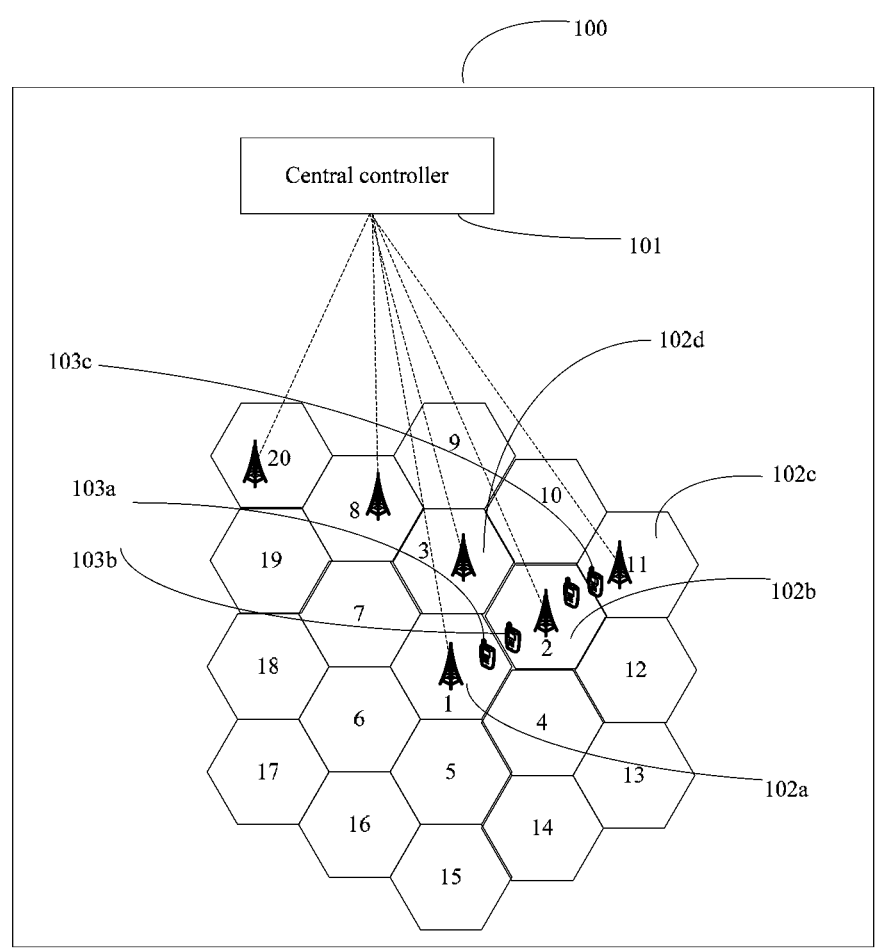
FIG. 1 is a schematic diagram of a wireless communications network according to an embodiment of the present disclosure.

FIG. 1 is a wireless communications network 100 according to an embodiment of the present disclosure. The network may be a Long Term Evolution (LTE) network, or may be an LTE-Advanced network. The wireless communications network includes several base stations (for example, 102*a*, 102*b*, 102*c*, and 102*d*), a central controller 101, and another network entity (for example, a core network, where a core network device is not shown in FIG. 1) that is used to support communication of several user equipments (for example, 103*a*, 103*b*, and 103*c*).

A base station 102 is an evolved NodeB (eNodeB) in the LTE. A base station may support/manage one or more cells. Each base station may serve multiple UEs. A UE selects a cell to initiate network access, and performs a voice and/or data service with the base station 102.

User equipment (UE) 103 may also be referred to as a mobile terminal (MT), a mobile station (MS), or the like.

To achieve time synchronization between all base stations in the network, one base station may be selected, and the base station is used as a reference point to adjust time of other base stations to be consistent with the time of the base station. The base station that is selected as the reference point is referred to as a reference base station, and other base stations are referred to as non-reference base stations.

The central controller 101 may exchange information with each base station. At least one time difference between the base stations is acquired, a time adjustment value of the non-reference base station relative to the reference base station is acquired according to the at least one time difference and reference time of the reference base station, and the time adjustment value is sent to the non-reference base station, so that the non-reference base station performs time adjustment according to the time adjustment value, to keep time synchronous with the reference base station. The central controller 101 may be independent of a base station and serve as an independent network element, or may be disposed in one base station and serve as a functional entity of the base station. A system uses the time of the reference base station as the reference time, and other base stations as non-reference base stations. When there is a deviation between the time of the non-reference base stations and the reference time, the time of the non-reference base stations is adjusted, so that the non-reference base stations keep time synchronous with the reference base station.

Embodiment 1

Figure 3:
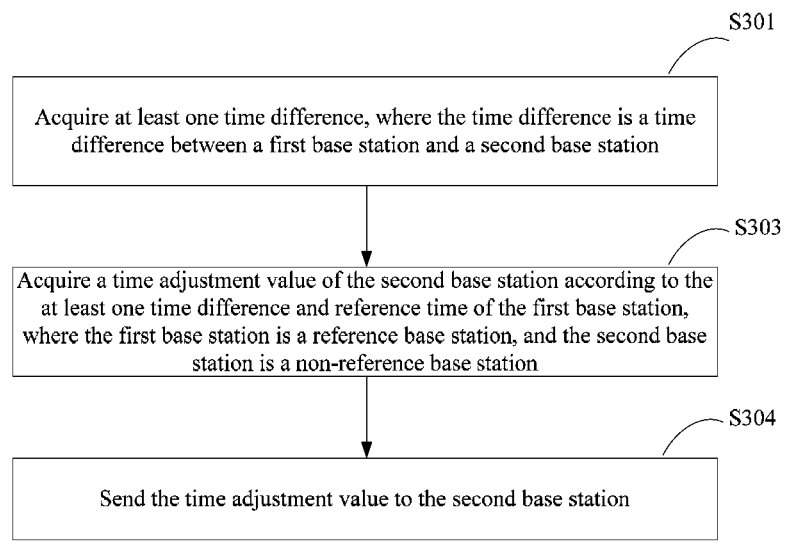
FIG. 3 is a central controller processing method in air-interface-based synchronization according to an embodiment of the present disclosure.

FIG. 3 is a central controller processing method in an air-interface-based synchronization solution according to an embodiment of the present disclosure. Details are as follows:

S301: Acquire at least one time difference, where the time difference is a time difference between a first base station and a second base station.

The at least one time difference includes a first time difference, where the first time difference is the first time difference that is between the first base station and the second base station and acquired by using active random access of a first UE. The active random access may also be referred to as uplink resynchronization, which is non-contention based random access. The first time difference may be a time difference that is between the first base station and the second base station and calculated by the first base station according to a first receiving moment and a second receiving moment, where the first receiving moment is a moment when the first base station receives a first random access preamble, and the second receiving moment is a moment when the second base station receives the first random access preamble. The first random access preamble is a preamble used for the first UE to perform active random access to the first base station, and is also a random access preamble allocated by the first base station to the first UE.

The central controller may periodically send a time difference request message to the first base station or the second base station, or may send a time difference request message to the first base station or the second base station when load of the first base station or the second base station is lower than a load threshold according to a load status of the first base station or the second base station, or may send a time difference request message to the first base station or the second base station according to a requirement of a system, so that the first base station or the second base station selects the first UE according to the time difference request message, and acquires the first time difference between the first base station and the second base station by using active random access of the first UE. The second base station and the first base station are neighboring base stations for each other.

The central controller may send the time difference request message to the first base station at least once, and acquire at least one time difference by using the first base station. It may be understood that the central controller may send a time difference request message to the second base station at least once, and acquire at least one time difference by using the second base station.

S303: Acquire a time adjustment value of the second base station according to the at least one time difference and reference time of the first base station, where the first base station is a reference base station, and the second base station is a non-reference base station.

The central controller processes the foregoing at least one time difference, to obtain a time difference of the second base station relative to the first base station or a time difference of the first base station relative to the second base station.

The central controller determines the time adjustment value of the non-reference base station according to the reference time of the reference base station in the system, so that the non-reference base station performs time adjustment according to the time adjustment value, and keeps synchronous with the time of the reference base station.

If there is only one time difference, the central controller acquires, according to the reference time of the first base station and the acquired one time difference, the time adjustment value of the second base station relative to the first base station, that is, acquires the time adjustment value of the non-reference base station relative to the reference base station.

If there are at least two time differences, the central controller processes the at least two time differences, where the processing includes performing averaging, or averaging two time differences with a minimum difference, or removing a largest value and a smallest value from the multiple time differences and averaging the remaining time differences. The central controller acquires, according to the reference time of the first base station and a time difference obtained after the averaging, the time adjustment value of the second base station relative to the first base station, that is, acquires the time adjustment value of the non-reference base station relative to the reference base station.

S304: Send the time adjustment value to the second base station.

After acquiring the time adjustment value of the non-reference base station relative to the reference base station, the central controller sends the time adjustment value to the non-reference base station, so that the non-reference base station performs time adjustment according to the time adjustment value, to keep time synchronous with the reference base station.

The reference base station is the first base station. The central controller sends the time adjustment value to the second base station, so that the second base station performs time adjustment according to the time adjustment value.

When a base station has the functions of the foregoing central controller, the foregoing processing method is executed by the base station.

Figure 4:
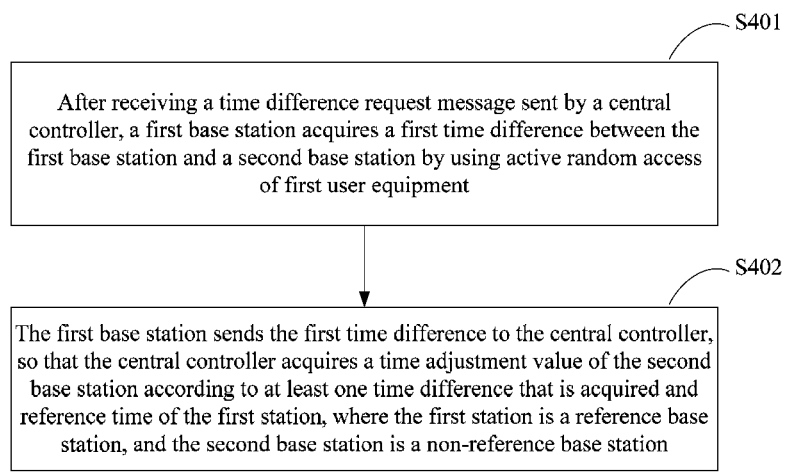
FIG. 4 is a base station processing method in air-interface-based synchronization according to an embodiment of the present disclosure.

FIG. 4 is a first base station processing method in an air-interface-based time synchronization solution according to an embodiment of the present disclosure. Details are as follows:

S401: After receiving a time difference request message sent by the central controller, the first base station acquires a first time difference between the first base station and the second base station by using active random access of first user equipment.

After receiving the time difference request message, the first base station selects the first UE, and allocates a first random access preamble to the first UE, where the first random access preamble is a non-contention based random access preamble, so that the first UE initiates active random access to the first base station by using the first random access preamble. The first UE is a UE that accesses the first base station.

The second base station is a neighboring base station of the first base station. The first base station calculates the first time difference according to the first receiving moment and the second receiving moment, where the first receiving moment is a moment when the first base station receives the first random access preamble, the second receiving moment is a moment when the second base station receives the first random access preamble, and the first base station receives the second receiving moment sent by the second base station.

S402: The first base station sends the first time difference to the central controller, so that the central controller acquires the time adjustment value of the second base station according to the acquired at least one time difference and the reference time of the first base station, where the first base station is the reference base station, and the second base station is the non-reference base station.

The at least one time difference includes the first time difference.

Figure 5:
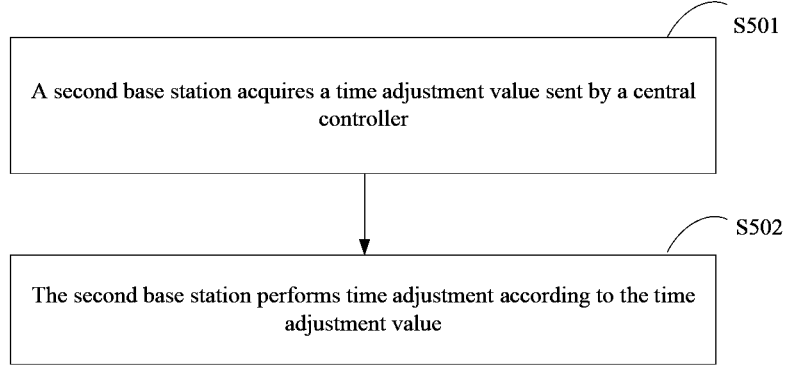
FIG. 5 is a base station processing method in air-interface-based synchronization according to an embodiment of the present disclosure.

FIG. 5 is a second base station processing method in an air-interface-based time synchronization solution according to an embodiment of the present disclosure. Details are as follows:

S501: The second base station acquires the time adjustment value sent by the central controller.

The second base station receives the time adjustment value sent by the central controller, where the time adjustment value is the time adjustment value of the second base station relative to the first base station acquired by the central controller according to the at least one time difference between the first base station and the second base station and the reference time of the first base station. The at least one time difference includes the first time difference, where the first time difference is the time difference acquired by the first base station according to the time difference request message and by using active random access of the first UE.

S502: The second base station performs time adjustment according to the time adjustment value.

The second base station performs time adjustment according to the acquired time adjustment value, to complete time synchronization.

It may be understood that the foregoing central controller processing method, first base station processing method, and second base station processing method are also applicable when the second base station receives a time difference request message of the central controller. If the second base station is the reference base station and the first base station is the non-reference base station, the foregoing processing methods are also applicable.

In this embodiment, a time difference between base stations is acquired by means of signaling interaction by using active random access of user equipment, and a time adjustment value of a non-reference base station is acquired according to reference time of a reference base station, so that the non-reference base station performs time adjustment according to the time adjustment value, to implement time synchronization between the non-reference base station and the reference base station, without a need of using an expensive synchronization device, thereby reducing construction and maintenance costs, and achieving a technical effect in an economic and convenient manner.

Embodiment 2

Figure 6:
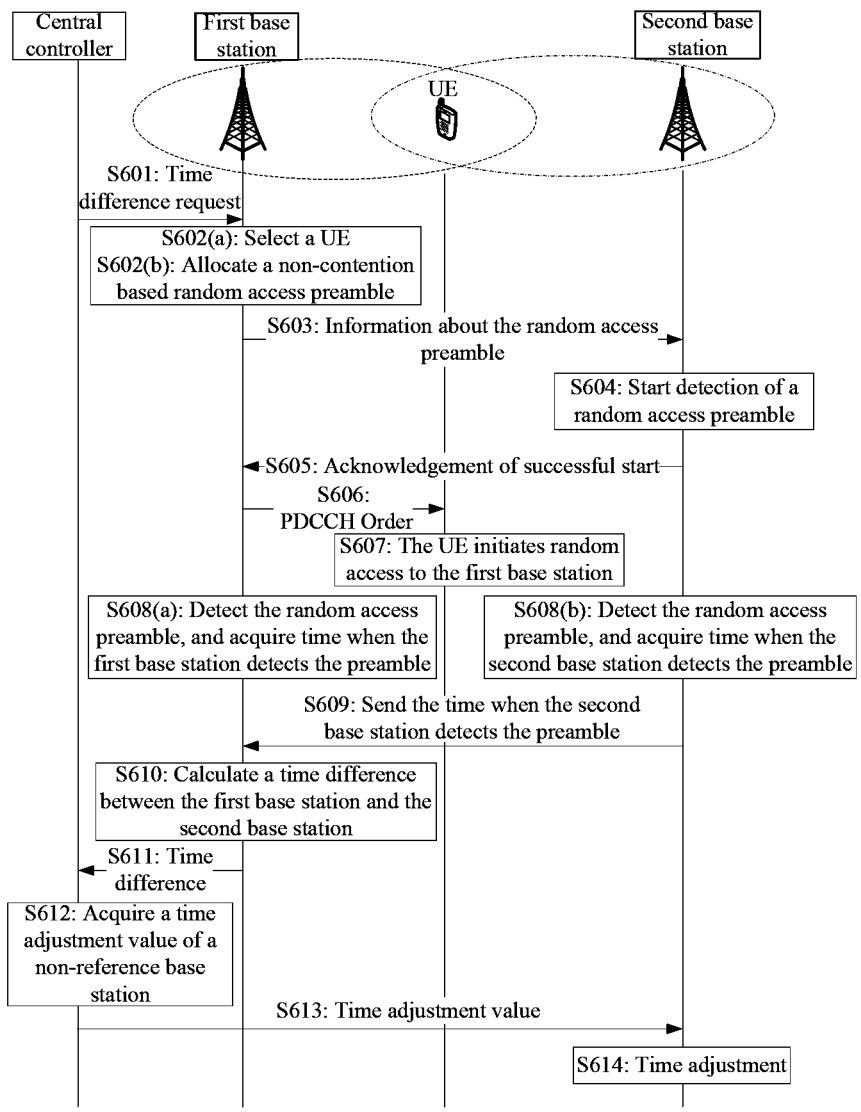
FIG. 6 is a method of acquiring a time difference between base stations according to an embodiment of the present disclosure.

In a wireless communications system shown in FIG. 1, a process of performing air-interface-based time synchronization between base stations by using active random access of user equipment is described in detail as follows:

FIG. 6 is a method of acquiring a time difference between base stations according to an embodiment of the present disclosure, which is described as follows:

S601: A central controller sends a time difference request message to a first base station, where the central controller may periodically send the time difference request message to the first base station, or may send the time difference request message to the first base station when load of the first base station is lower than a load threshold according to a load status or a service status of the first base station, or may send the time difference request message to the first base station according to a system requirement.

S602($a$): After receiving the time difference request message sent by the central controller, the first base station selects first UE, where the first UE is a UE that accesses the first base station.

Optionally, the first base station may acquire a downlink RSRP of the first base station measured by the first UE, and a downlink RSRP of a second base station measured by the first UE, where the second base station is a neighboring base station of the first base station. When a difference between the downlink RSRP of the first base station and the downlink RSRP of the second base station is lower than a first threshold, the first base station considers the first UE as an edge UE, that is, the first UE is located in an overlapping area of coverage of the first base station and the second base station, and it may be considered that a transmission delay from the first UE to the first base station is approximately equal to a transmission delay from the first UE to the second base station, and then the first UE is selected, that is, a difference between downlink signal strength of the first base station measured by the first UE and downlink signal strength of the second base station measured by the first UE is lower than the first threshold. The downlink signal strength may be a downlink reference signal received power (RSRP), or may be another measurement value representing signal strength, for example, a signal to interference plus noise ratio (SINR).

S602(b): The first base station allocates a first random access preamble to the selected first UE, where the first random access preamble is a non-contention based random access preamble, so that the first UE initiates active random access to the first base station by using the first random access preamble.

S603: The first base station sends the first random access preamble to a second base station.

S604: The second base station starts random access preamble detection after acquiring the first random access preamble. The first base station is a serving base station of the first UE, and the second base station is not a serving base station of the first UE. Therefore, to acquire a time difference between base stations by detecting the random access preamble of the first UE, the second base station needs to start detection of a random access preamble after acquiring the first random access preamble sent by the first base station. That the second base station starts random access preamble detection may be understood as that the second base station originally does not need to detect the first random access preamble; however, to acquire the time difference between base stations by detecting the random access preamble by the base station, the second base station needs to detect the first random access preamble.

S605: After starting the random access preamble detection, the second base station sends an acknowledgement message of successful start of the random access preamble detection to the first base station.

S606: After receiving the acknowledgement message of successful start of the random access preamble detection sent by the second base station, the first base station triggers the first UE to initiate active random access, that is, triggers the first UE to perform uplink resynchronization. Specifically, the first base station sends a physical downlink control channel order (PDCCH Order) to the first UE, where the PDCCH Order carries an index of the first random access preamble allocated by the first base station to the first UE.

S607: After receiving the PDCCH Order, the first UE initiates random access to the first base station according to the first random access preamble corresponding to the index of the first random access preamble carried in the PDCCH Order.

S608(a): The first base station detects the first random access preamble, and acquires a first receiving moment, where the first receiving moment is a moment when the first base station detects the first random access preamble.

S608(b): The second base station detects the first random access preamble, and acquires a second receiving moment, where the second receiving moment is a moment when the second base station detects the first random access preamble. A particular sequence does not exist between step S608(a) and step S608(b).

S609: The second base station sends the second receiving moment to the first base station.

The first base station acquires the second receiving moment.

S610: The first base station calculates a first time difference between the first base station and the second base station according to the first receiving moment and the second receiving moment.

Optionally, the second base station sends the index of the first random access preamble and the second receiving moment to the first base station; before calculating the first time difference, the first base station compares an index of the random access preamble corresponding to the first receiving moment with an index of the random access preamble corresponding to the second receiving moment, and if the indexes are the same, the first base station calculates the first time difference. After receiving the time difference request message sent by the central controller, the first base station acquires the first time difference between the first base station and the second base station by using active random access of the first UE.

The first time difference between the first base station and the second base station is calculated as follows:

First time difference=(Second receiving moment−First receiving moment); or

First time difference=(First receiving moment−Second receiving moment).

The present disclosure does not limit a calculation manner of the time difference between the first base station and the second base station, as long as it can be ensured that calculation manners of the time difference are consistent, for example, a time difference of the first base station relative to the second base station is calculated for all cases.

For an LTE system, the foregoing first receiving moment and second receiving moment include a system frame number, a subframe number, and an intra-subframe deviation.

In the foregoing process, information exchange between the first base station and the second base station may be based on an X2 interface, or may be based on an S1 interface; an existing interface message may be extended to carry the foregoing information, or a new interface message may be constructed to carry the foregoing information.

S611: The first base station sends the first time difference to the central controller. Specifically, the first base station sends a time difference report to the central controller, where the time difference report includes an identifier of the first base station, an identifier of the second base station, and the first time difference, and the identifiers are used to identify the base stations. Optionally, according to a sequence of the two identifiers in the time difference report, the sequence of the identifiers is used to indicate whether the first time difference in the time difference report is the time difference of the first base station relative to the second base station or the time difference of the second base station relative to the first base station.

Optionally, the first base station may select multiple UEs, and according to the foregoing method, acquire multiple time differences and send them to the central controller.

Optionally, the first base station may send the first receiving moment to the second base station, the second base station calculates the first time difference between the first base station and the second base station, and the second base station reports the first time difference to the central controller; or the second base station sends the first time difference obtained through calculation to the first base station, and the first base station reports the first time difference to the central controller.

Optionally, after collecting multiple time differences, the first base station reports all the multiple time differences to the central controller by using the time difference report. In this case, the time difference report includes the identifier of the first base station, the identifier of the second base station, and the multiple time differences.

It may be understood that the central controller may alternatively send a time difference request message to the second base station, and use the second base station to acquire the time difference between the first base station and the second base station by using active random access of the UE.

The central controller acquires at least one time difference between the first base station and the second base station. The at least one time difference includes the first time difference.

S612: When the reference base station is the first base station, the second base station is the non-reference base station. The central controller acquires, according to the at least one time difference between the first base station and the second base station and the reference time of the first base station, a time adjustment value of the second base station relative to the first base station, that is, acquires a time adjustment value of the non-reference base station relative to the reference base station.

Specifically, the central controller processes the acquired at least one time difference between the first base station and the second base station, and acquires at least one time difference of the second base station relative to the first base station. If there is only one time difference, because the first base station is the reference base station, the central controller can obtain, according to the time difference of the second base station relative to the first base station, the time adjustment value of the second base station relative to the reference base station, namely the time adjustment value of the non-reference base station relative to the reference base station. If there are at least two time differences, the central controller processes the time difference of the second base station relative to the first base station, which may specifically be averaging the foregoing time differences, or averaging two time differences with a minimum difference, or removing a largest value and a smallest value of the at least one time difference and averaging the remaining time differences, to obtain an average time difference of the second base station relative to the first base station; the central controller acquires, according to the average time difference and the reference time of the reference base station, the time adjustment value of the second base station relative to the reference base station, namely the time adjustment value of the non-reference base station relative to the reference base station.

S613: The central controller sends the time adjustment value to the second base station, that is, sends the time adjustment value to the non-reference base station. Specifically, the central controller sends a time adjustment command message to the second base station, where the time adjustment command message carries the time adjustment value and the identifier of the second base station.

Optionally, the central controller performs determining before sending the time adjustment value to the non-reference base station, and if the non-reference base station needs to perform time adjustment, that is, if the second base station needs to perform time adjustment, the central controller sends the time adjustment value to the second base station.

S614: The second base station acquires the time adjustment value sent by the central controller, and performs time adjustment according to the time adjustment value, to complete time synchronization. Specifically, the second base station receives the time adjustment command message sent by the central controller, acquires the time adjustment value, and performs time adjustment according to the time adjustment value, to complete time synchronization.

Similarly, when the reference base station is the second base station, the first base station is the non-reference base station. The central controller acquires, according to the at least one time difference between the first base station and the second base station and the reference time of the reference base station, a time adjustment value of the first base station relative to the second base station, that is, acquires a time adjustment value of the non-reference base station relative to the reference base station.

The central controller sends the time adjustment value to the first base station, that is, sends the time adjustment value to the non-reference base station. Specifically, the central controller sends a time adjustment command message to the first base station, where the time adjustment command message carries the time adjustment value and the identifier of the first base station.

The first base station acquires the time adjustment value sent by the central controller, and performs time adjustment according to the time adjustment value, to complete time synchronization.

In this embodiment, a time difference between base stations is acquired by means of signaling interaction by using active random access of user equipment, and a time adjustment value of a non-reference base station is acquired according to reference time of a reference base station, so that the non-reference base station performs time adjustment according to the time adjustment value, to implement time synchronization between the non-reference base station and the reference base station, without a need of using an expensive synchronization device, thereby reducing construction and maintenance costs, and achieving a technical effect in an economic and convenient manner.

Embodiment 3

Referring to FIG. 1, a central controller 101 is independent of a base station, a serving base station of a first UE 103a is a base station 102a, a serving base station of a second UE 103b is a base station 102b, and the first UE 103a and the second UE 103b are located on edges of the base stations. The base station 102a and the base station 102b are neighboring base stations for each other. A process of air-interface-based time synchronization is described in detail as follows:

The central controller 101 sends a time difference request message to the base station 102a and/or the base station 102b.

A processing process after the base station 102a acquires the time difference request message sent by the central controller 101 is the same as the description in Embodiment 2. In the processing process, the base station 102a serves as a first base station, and the base station 102b serves as a second base station.

A processing process after the base station 102b acquires the time difference request message sent by the central controller 101 is the same as the description in Embodiment 2. In the processing process, the base station 102b serves as a first base station, and the base station 102a serves as a second base station.

The central controller 101 uses the base station 102a and/or the base station 102b to acquire at least one time difference between the base station 102a and the base station 102b. Processing of the central controller 101 on the acquired at least one time difference between the base station 102a and the base station 102b is the same as that described in Embodiment 2.

When the base station 102b is a reference base station, the base station 102a is a non-reference base station. The central controller 101 acquires, according to the at least one time difference between the base station 102a and the base station 102b and reference time of the reference base station, a time adjustment value of the base station 102a relative to the base station 102b, that is, acquires a time adjustment value of the non-reference base station relative to the reference base station. The central controller 101 sends the time adjustment value to the base station 102a, that is, sends the time adjustment value to the non-reference base station. Specifically, the central controller 101 sends a time adjustment command message to the base station 102a, where the time adjustment command message carries the time adjustment value and an identifier of the base station 102a. The base station 102a receives the time adjustment command message sent by the central controller 101, acquires the time adjustment value, and performs time adjustment according to the time adjustment value, to complete time synchronization.

When the base station 102a is the reference base station, the base station 102b is the non-reference base station. The central controller 101 acquires, according to the at least one time difference between the base station 102a and the base station 102b and the reference time of the reference base station, a time adjustment value of the base station 102b relative to the base station 102a, that is, acquires a time adjustment value of the non-reference base station relative to the reference base station. The central controller 101 sends the time adjustment value to the base station 102b, that is, sends the time adjustment value to the non-reference base station. Specifically, the central controller 101 sends a time adjustment command message to the base station 102b, where the time adjustment command message carries the time adjustment value and an identifier of the base station 102b. The base station 102b receives the time adjustment command message sent by the central controller 101, acquires the time adjustment value, and performs time adjustment according to the time adjustment value, to complete time synchronization.

Optionally, the central controller 101 performs determining before sending a time adjustment command to the non-reference base station. If the non-reference base station needs to perform time adjustment, the central controller 101 sends the time adjustment command to the non-reference base station. If the non-reference base station does not need to perform the time adjustment, the central controller 101 performs no processing.

In this embodiment, a time difference between base stations is acquired by means of signaling interaction by using active random access of user equipment, and a time adjustment value of a non-reference base station is acquired according to reference time of a reference base station, so that the non-reference base station performs time adjustment according to the time adjustment value, to implement time synchronization between the non-reference base station and the reference base station, without a need of using an expensive synchronization device, thereby reducing construction and maintenance costs, and achieving a technical effect in an economic and convenient manner.

Embodiment 4

Figure 7:
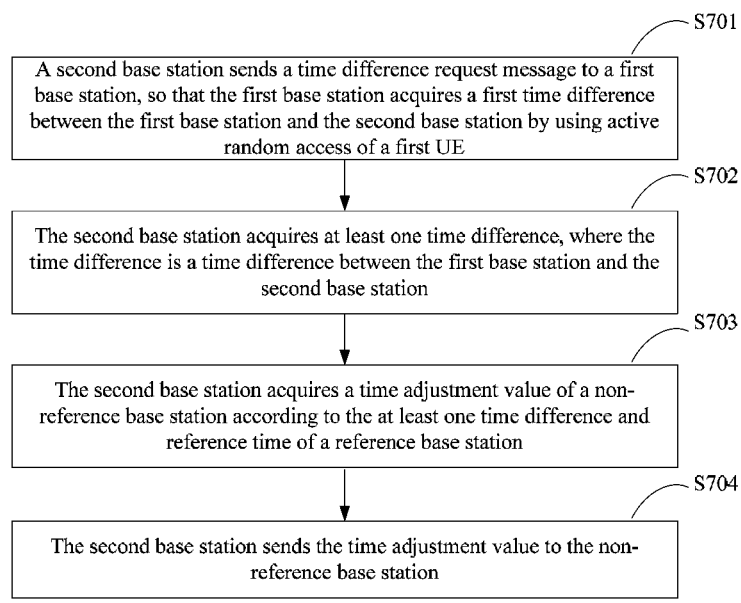
FIG. 7 is another base station processing method in air-interface-based synchronization according to an embodiment of the present disclosure.

In a case in which a base station includes functions of a central controller, a processing method of air-interface-based time synchronization is described in detail as follows:

FIG. 7 is another processing method of a second base station in air-interface-based synchronization according to an embodiment of the present disclosure.

S701: The second base station sends a time difference request message to a first base station, so that the first base station acquires a first time difference between the first base station and the second base station by using active random access of a first UE.

The second base station may periodically send the time difference request message to the first base station, or may send the time difference request message to the first base station when load of the first base station is lower than a load threshold according to a load status or a service status of the first base station, or may send the time difference request message to the base station according to a system requirement, so that the first base station acquires the first time difference between the first base station and the second base station according to the time difference request message and by using the active random access of the first UE. The active random access may also be referred to as uplink resynchronization, which is non-contention based random access. The second base station and the first base station are neighboring base stations for each other.

S702: The second base station acquires at least one time difference, where the time difference is a time difference between the first base station and the second base station.

The at least one time difference includes the first time difference, where the first time difference is the first time difference between the first base station and the second base station acquired by the first base station by using the active random access of the first UE, and the first time difference may be the time difference between the first base station and the second base station calculated by the first base station according to first receiving moment and second receiving moment.

The second base station may send the time difference request message to the first base station at least once, and may acquire at least one time difference.

It may be understood that the second base station may send the time difference request message to the second base station itself, and acquire the time difference between the base stations by selecting UE to initiate active random access.

S703: The second base station acquires a time adjustment value of a non-reference base station according to the at least one time difference and reference time of a reference base station.

The second base station processes the foregoing at least one time difference, and obtains an average time difference of the first base station relative to the second base station, or an average time difference of the second base station relative to the first base station. In a case in which there are at least two time differences, the processing includes performing averaging, or averaging two time differences with a minimum difference, or removing a largest value and a smallest value of the multiple time differences and averaging the remaining time differences. The time adjustment value of the non-reference base station is determined according to a time difference obtained through the averaging and the reference time of the reference base station.

If there is only one time difference, the second base station directly determines the time adjustment value of the non-reference base station according to this time difference and the reference time of the reference base station.

When the reference base station is the second base station, the non-reference base station is the first base station; or, when the reference base station is the first base station, the non-reference base station is the second base station.

S704: The second base station sends the time adjustment value to the non-reference base station.

Therefore, the non-reference base station performs time adjustment according to the acquired time adjustment value, to complete time synchronization.

Figure 8:
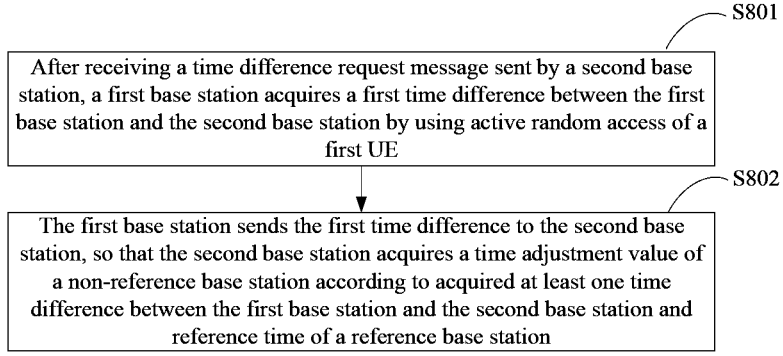
FIG. 8 is another base station processing method in air-interface-based synchronization according to an embodiment of the present disclosure.

FIG. 8 is another processing method of a first base station in air-interface-based synchronization according to an embodiment of the present disclosure.

S801: After receiving the time difference request message sent by the second base station, the first base station acquires the first time difference between the first base station and the second base station by using active random access of the first UE.

After receiving the time difference request message, the first base station selects the first UE, where a serving base station of the first UE is the first base station, and allocates a first random access preamble to the first UE, where the first random access preamble is a non-contention based random access preamble, so that the first UE initiates active random access to the first base station by using the first random access preamble.

The first base station detects the first random access preamble, acquires a first receiving moment, and calculates the first time difference by using the first receiving moment and a second receiving moment, where the second receiving moment is the receiving moment acquired by the second base station by detecting the first random access preamble.

S802: The first base station sends the first time difference to the second base station, so that the second base station acquires the time adjustment value of the non-reference base station according to the acquired at least one time difference between the first base station and the second base station and the reference time of the reference base station.

The first base station sends the first time difference to the second base station.

The at least one time difference includes the first time difference. When the reference base station is the second base station, the non-reference base station is the first base station; or, when the reference base station is the first base station, the non-reference base station is the second base station. The second base station acquires the time adjustment value of the non-reference base station, and the non-reference base station performs time adjustment according to the time adjustment value.

In this embodiment, a time difference between base stations is acquired by means of signaling interaction by using active random access of user equipment, and a time adjustment value of a non-reference base station is acquired according to reference time of a reference base station, so that the non-reference base station performs time adjustment according to the time adjustment value, to implement time synchronization between the non-reference base station and the reference base station, without a need of using an expensive synchronization device, thereby reducing construction and maintenance costs, and achieving a technical effect in an economic and convenient manner.

Embodiment 5

Figure 9:
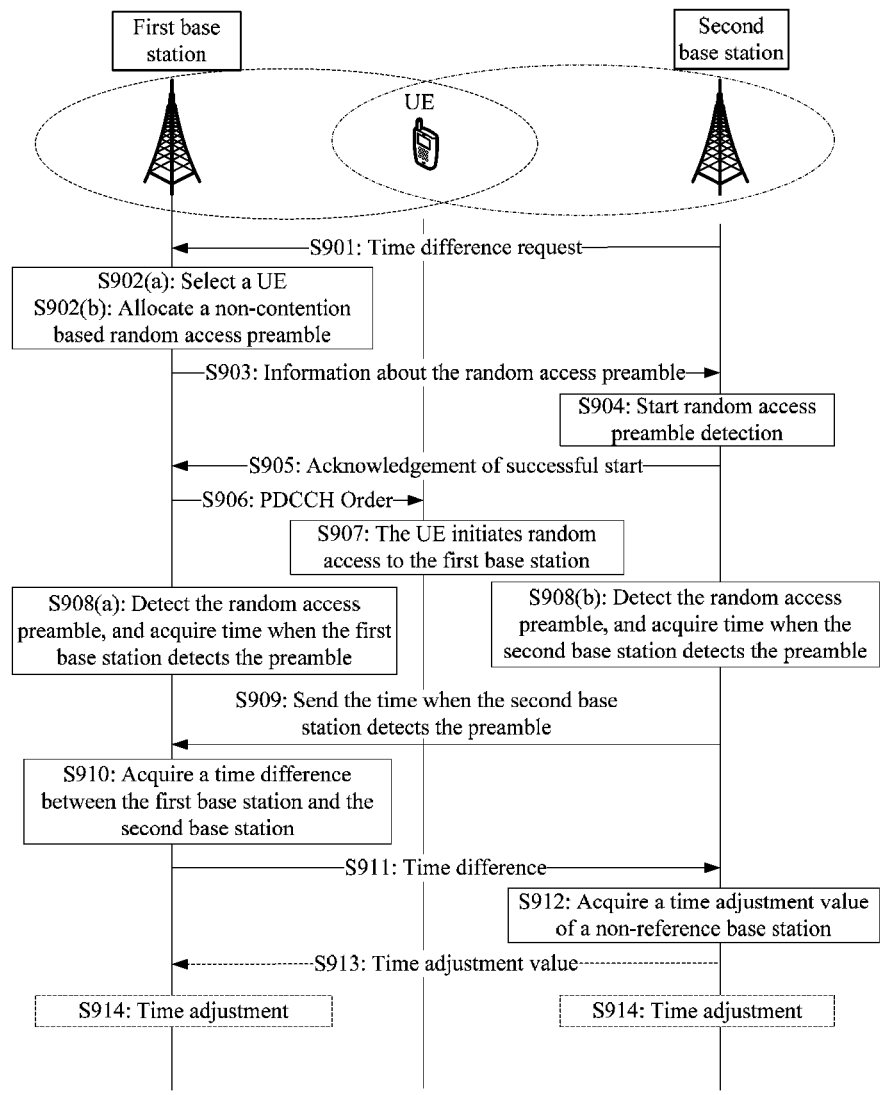
FIG. 9 is another method of acquiring a time difference between base stations according to an embodiment of the present disclosure.

In this embodiment, a second base station has functions of a central controller in Embodiment 2. FIG. 9 is another method of acquiring a time difference between base stations according to an embodiment of the present disclosure, and details are as follows:

S901: The second base station sends a time difference request message to a first base station. The second base station may periodically send the time difference request message to the first base station, or may send the time difference request message to the first base station when load of the first base station is lower than a load threshold according to a load status or a service status of the first base station, or may send the time difference request message to the first base station according to a system requirement.

The first base station receives the time difference request message sent by the second base station. After receiving the time difference request message sent by the second base station, the first base station selects first UE, where a serving base station of the first UE is the first base station. A processing method of acquiring a first time difference between the first base station and the second base station by using active random access of the first UE is the same as that described in Embodiment 2, that is, step S902(*a*) to step S910 in FIG. 9 are the same as step S602(*a*) to step S610 in FIG. 6, and details are not repeatedly described herein.

Different from Embodiment 2, when step S911 is executed by the first base station, the first base station sends the first time difference to the second base station. The second base station receives the first time difference sent by the first base station.

It may be understood that the second base station may also acquire a time difference between the first base station and the second base station by using the active random access of the UE.

According to the foregoing method, the second base station may acquire multiple time differences between the first base station and the second base station, that is, the second base station acquires at least one time difference between the first base station and the second base station, where the at least one time difference includes the first time difference.

S912: The second base station acquires, according to at least one time difference between the first base station and the second base station and reference time of a reference base station, a time adjustment value of a non-reference base station relative to the reference base station.

S913: The second base station sends the time adjustment value to the non-reference base station.

S914: The non-reference base station performs time adjustment after acquiring the time adjustment value.

A method for processing the time difference and the time adjustment value by the second base station is the same as the processing method of the central controller in Embodiment 2, which is not repeatedly described. If the reference base station is the second base station, the second base station sends the time adjustment value to the first base station, so that the first base station performs time adjustment according to the time adjustment value; or, if the reference base station is the first base station, the second base station performs time adjustment according to the time adjustment value.

When the reference base station is the second base station, the first base station is the non-reference base station, and the second base station acquires, according to the at least one time difference between the first base station and the second base station and the reference time of the reference base station, a time adjustment value of the first base station relative to the second base station.

The second base station processes the acquired at least one time difference between the first base station and the second base station.

The second base station sends the time adjustment value to the first base station.

Optionally, the second base station performs determining before sending the time adjustment value. If the first base station, namely the non-reference base station, needs to perform time adjustment, the central controller sends the time adjustment value to the first base station.

The first base station receives the time adjustment value sent by the second base station, and performs time adjustment according to the time adjustment value, to complete time synchronization.

When the reference base station is the first base station, the second base station is the non-reference base station, and the second base station acquires, according to the at least one time difference between the first base station and the second base station and the reference time of the reference base station, a time adjustment value of the second base station relative to the first base station, that is, acquires a time adjustment value of the non-reference base station relative to the reference base station. The second base station sends the time adjustment value to the non-reference base station. Because the non-reference base station is the second base station, the second base station may directly perform time adjustment according to the acquired time adjustment value, to complete time synchronization.

In this embodiment, a time difference between base stations is acquired by means of signaling interaction by using active random access of user equipment, and a time adjustment value of a non-reference base station is acquired according to reference time of a reference base station, so that the non-reference base station performs time adjustment according to the time adjustment value, to implement time synchronization between the non-reference base station and the reference base station, without a need of using an expensive synchronization device, thereby reducing construction and maintenance costs, and achieving a technical effect in an economic and convenient manner.

Embodiment 6

In this embodiment, a base station 102a includes functions of a central controller in Embodiment 2, a serving base station of UE 103a is the base station 102a, a serving base station of UE 103b is a base station 102b, and the UE 103a and the UE 103b are located on edges of the base stations. The base station 102a and the base station 102b are neighboring base stations for each other. Air-interface-based time synchronization is described in detail as follows:

The base station 102a sends a time difference request message to the base station 102b.

A processing process after the base station 102b acquires the time difference request message sent by the base station 102a is the same as that described in Embodiment 5. The base station 102b selects the UE 103b, allocates a random access preamble, calculates a time difference, and sends the time difference to the base station 102a.

Because the base station 102a includes the functions of the central controller, in actual application, the base station 102a may also deliver the time difference request message to the base station 102a itself. A processing process after the base station 102a knows that collection of time differences between the base stations needs to be performed (similar to that the time difference request message is received) is the same as that described in Embodiment 5. The base station 102a selects the UE 103a, allocates the random access preamble, and calculates the time difference. A difference is that the base station 102a does not need to send the time difference to the central controller, because the base station 102a includes the functions of the central controller.

The base station 102a acquires at least one time difference between the base station 102a and the base station 102b.

Processing by the base station 102a on the acquired at least one time difference between the base station 102a and the base station 102b is the same as that described in Embodiment 5.

When the base station 102a is a reference base station, the base station 102b is a non-reference base station. The base station 102a acquires, according to the at least one time difference between the base station 102a and the base station 102b and reference time of the reference base station, a time adjustment value of the base station 102b relative to the base station 102a, that is, acquires a time adjustment value of the non-reference base station relative to the reference base station. The base station 102a sends the time adjustment value to the base station 102b, that is, sends the time adjustment value to the non-reference base station. Specifically, the base station 102a sends a time adjustment command message to the base station 102b, where the time adjustment command message carries the time adjustment value and an identifier of the base station 102b. The base station 102b receives the time adjustment command message sent by the base station 102a, acquires the time adjustment value, and performs time adjustment according to the time adjustment value, to complete time synchronization.

Optionally, the base station 102a performs determining before sending a time adjustment command to the non-reference base station. If the non-reference base station needs to perform time adjustment, the base station 102a sends the time adjustment command to the non-reference base station. If the non-reference base station does not need to perform the time adjustment, the base station 102a performs no processing.

When the base station 102b is the reference base station, the base station 102a is the non-reference base station. The base station 102a acquires, according to the at least one time difference between the base station 102a and the base station 102b and the reference time of the reference base station, a time adjustment value of the base station 102a relative to the base station 102b, that is, acquires a time adjustment value of the non-reference base station relative to the reference base station. In this case, the base station 102a directly performs time adjustment according to the acquired time adjustment value, to complete time synchronization.

Embodiment 7

In this embodiment, a base station 102a includes functions of a central controller in Embodiment 2, the base station 102a is a reference base station, the base station 102a and a base station 102b are neighboring base stations for each other, and the base station 102b and a base station 102c are neighboring base stations for each other. That the base station 102c performs time synchronization with the reference base station by using an air interface is described in detail as follows:

After receiving a time difference request message of the base station 102a, the base station 102c acquires a time difference between the base station 102c and the base station 102b and reports the time difference to the base station 102a. The base station 102b may also receive the time difference request message of the base station 102a, acquire the time difference between the base station 102c and the base station 102b, and report the time difference to the base station 102a. For the base station 102c or the base station 102b, a process of acquiring the time difference between the base station 102c and the base station 102b is the same as that described in Embodiment 2, except that the base station 102c or the base station 102b reports the time difference to the base station 102a.

The base station 102a uses the base station 102c and/or the base station 102b to acquire at least one time difference between the base station 102c and the base station 102b.

The base station 102a may acquire, according to the at least one time difference between the base station 102c and the base station 102b, a time adjustment value of the base station 102c relative to the base station 102b. Processing on the time difference is the same as that described in Embodiment 5.

To acquire a time difference of the base station 102c relative to the reference base station, namely the base station 102a, a time difference of the base station 102b relative to the base station 102a needs further to be acquired. The time difference of the base station 102b relative to the base station 102a is described in Embodiment 8.

Because the base station 102a is the reference base station, the base station 102a may acquire, according to the time difference of the base station 102c relative to the base station 102b and the time difference of the base station 102b relative to the base station 102a, the time difference of the base station 102c relative to the base station 102a, that is, acquires the time adjustment value of the base station 102c relative to the reference base station. The time difference herein may be an average time difference. Processing on the time difference is the same as that described in Embodiment 5.

The base station 102a sends a time adjustment value to the base station 102c. Specifically, the base station 102a sends a time adjustment command message to the base station 102c, where the time adjustment command message carries the time adjustment value and an identifier of the base station 102c.

The base station 102c receives the time adjustment command message sent by the base station 102a, acquires the time adjustment value, and performs time adjustment, to complete time synchronization.

Optionally, the base station 102a performs determining before sending a time adjustment command. If the base station 102c needs to perform time adjustment, the base station 102a sends the time adjustment command to the base station 102c.

In this embodiment, the base station 102a may send the time adjustment value to the base station 102b. The base station 102b receives the time adjustment command message sent by the base station 102a, acquires the time adjustment value, and performs time adjustment, to complete time synchronization.

In this embodiment, a time difference between base stations is acquired by means of signaling interaction by using active random access of user equipment, and a time adjustment value of a non-reference base station is acquired according to reference time of a reference base station, so that the non-reference base station performs time adjustment according to the time adjustment value, to implement time synchronization between the non-reference base station and the reference base station, without a need of using an expensive synchronization device, thereby reducing construction and maintenance costs, and achieving a technical effect in an economic and convenient manner.

Embodiment 8

Figure 2:
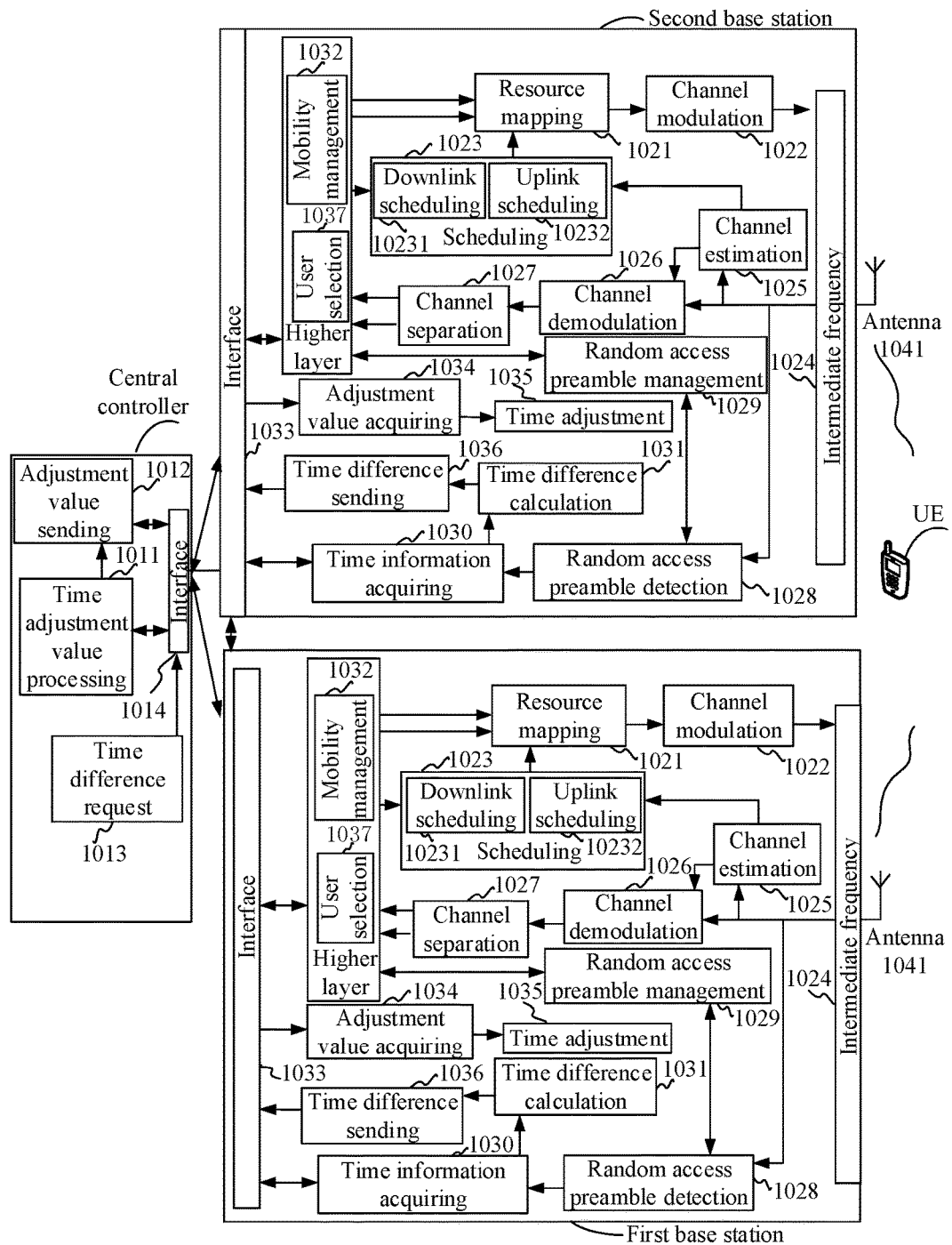
FIG. 2 is a schematic structural diagram of an air-interface-based synchronization apparatus according to an embodiment of the present disclosure.

FIG. 2 is a schematic structural diagram of an air-interface-based synchronization apparatus according to an embodiment of the present disclosure, including schematic structural diagrams of a first base station, a second base station, and a central controller. An example that the first base station is a reference base station and the second base station is a non-reference base station is used for description.

The first base station includes a user selection unit 1037, a time difference calculation unit 1031, and a time difference sending unit 1036.

The user selection unit 1037 is configured to select first UE after receiving a time difference request message sent by the central controller. Optionally, when a difference between downlink signal strength of the first base station measured by the first UE and downlink signal strength of the second base station measured by the first UE is lower than a first threshold, the first UE is selected.

The time difference calculation unit 1031 is configured to acquire, according to the first UE selected by the user selection unit 1037, a first time difference between the first base station and the second base station by using active random access of the first UE.

The time difference sending unit 1036 is configured to send the first time difference acquired by the time difference calculation unit 1031 to the central controller, so that the central controller acquires a time adjustment value of the second base station according to at least one time difference that is acquired and reference time of the first base station, where the at least one time difference includes the first time difference, the first base station is the reference base station, and the second base station is the non-reference base station.

Optionally, to use a first receiving moment and a second receiving moment that are acquired by means of active random access of the first UE, so as to calculate the first time difference between the first base station and the second base station, the first base station further includes a random access preamble management unit 1029, a random access preamble detection unit 1028, a time information acquiring unit 1030, and a time difference calculation unit 1031.

The random access preamble management unit 1029 is configured to allocate a first random access preamble to the first UE selected by the user selection unit 1037, and send information about the first random access preamble to the second base station, so that the second base station starts random access preamble detection after receiving the information about the first random access preamble. The random access preamble management unit 1029 is further configured to receive an acknowledgement message of successful start of the random access preamble detection sent by the second base station.

The random access preamble detection unit 1028 is configured to detect the first random access preamble used by the first UE to initiate the active random access.

The time information acquiring unit 1030 is configured to acquire a first receiving moment and a second receiving moment, where the first receiving moment is a moment when the random access preamble detection unit 1028 detects the first random access preamble, and the second receiving moment is a moment when the second base station detects the first random access preamble.

Optionally, the first base station further includes a resource mapping unit 1021, configured to: after the random access preamble management unit receives the acknowledgement message of successful start of the random access preamble detection sent by the second base station, trigger the first UE to initiate active random access to the first base station by using the first random access preamble. A PDCCH Order is sent to the first UE by using the resource mapping unit 1021, where the PDCCH Order carries an index of the first random access preamble. The first UE initiates active random access to the first base station according to the first random access preamble.

The second base station includes an adjustment value acquiring unit 1034 and a time adjustment unit 1035.

The adjustment value acquiring unit 1034 is configured to receive a time adjustment value sent by the central controller. The time adjustment unit 1035 is configured to perform time adjustment according to the time adjustment value acquired by the adjustment value acquiring unit 1034, to complete time synchronization.

Because the first base station acquires the first time difference between the first base station and the second base station by using active random access of the first UE, the second base station further includes a random access preamble management unit 1029, a random access preamble detection unit 1028, and a time information acquiring unit 1030.

The random access preamble management unit 1029 is configured to receive the first random access preamble sent by the first base station.

The random access preamble detection unit 1028 is configured to start detection of a random access preamble after the random access preamble management unit 1029 receives the first random access preamble sent by the first base station.

The random access preamble management unit 1029 is further configured to send an acknowledgement message of successful start of the random access preamble detection to the first base station after the random access preamble detection unit 1028 starts the random access preamble detection, so that the first base station triggers the first UE to initiate active random access by using the first random access preamble.

The random access preamble detection unit 1028 is further configured to detect the first random access preamble used by the first UE to initiate the active random access.

The time information acquiring unit 1030 is configured to: when the random access preamble detection unit 1028 detects the first random access preamble, acquire the second receiving moment, and send the second receiving moment to the first base station.

Optionally, the first base station and the second base station each further include a channel modulation unit 1022, a scheduling unit 1023, an intermediate frequency unit 1024, a channel estimation unit 1025, a channel demodulation unit 1026, a channel separation unit 1027, and an interface unit 1033. The scheduling unit 1023 includes a downlink scheduling unit 10231 and an uplink scheduling unit 10232. The downlink scheduling unit 10231 is configured to perform downlink resource scheduling according to channel information fed back by the UE and user-related information from a higher layer. The uplink scheduling unit 10232 is configured to perform uplink resource scheduling according to a channel estimation result of an uplink from the channel estimation unit 1025 and a resource request from the UE.

The intermediate frequency unit 1024 is configured to perform up-conversion on an OFDM signal for which channel modulation has been performed, and send the OFDM signal to the UE through a wireless channel by using an antenna. The intermediate frequency unit 1024 receives an uplink signal of the UE by using the antenna, down-converts the uplink signal to obtain a baseband signal, and transmits the baseband signal to the channel estimation unit 1025, the channel demodulation unit 1026, and the random access preamble detection unit 1028.

The channel estimation unit 1025 is configured to estimate a feature of a wireless transmission path from a pilot channel of the uplink, and send a channel estimation result to the channel demodulation unit 1026. To perform the uplink and downlink resource scheduling accurately, the channel estimation result is further sent to the scheduling unit 1023.

The channel demodulation unit 1026 is configured to demodulate, according to the channel estimation result of the channel estimating unit 1025, a received signal sent by the intermediate frequency unit 1024. The channel separation unit 1027 separates a signal processed by the channel demodulation unit 1026 into user data and control data. CQI information about a downlink in the control data obtained after the separation is transmitted to the scheduling unit 1023, and other control data and the user data are transmitted to the higher layer.

The interface unit 1033 includes: an X2 interface between the base stations, which is configured for information exchange between the base stations; and an S1 interface between the base station and a core network, which is configured for information exchange between the base station and the core network; and when the central controller is located outside the base station, further includes: an interface between the base station and the central controller, which is configured for information exchange between the base station and the central controller.

The resource mapping unit 1021 is configured to map the control data and the user data that are input from the higher layer to a downlink control channel, a downlink synchronization channel, and a downlink data sharing channel according to a scheduling indication of the scheduling unit 1023. The channel modulation unit 1022 performs processing such as data modulation, serial/parallel conversion, IFFT transform, and CP insertion, and generates an OFDM signal.

The central controller apparatus acquires a time adjustment value of the second base station according to the acquired at least one time difference between the first base station and the second base station and the reference time of the first base station, so that the second base station performs time adjustment, to complete time synchronization. The central controller includes a time adjustment value processing unit 1011 and an adjustment value sending unit 1012.

The time adjustment value processing unit 1011 is configured to acquire the time adjustment value of the second base station according to the acquired at least one time difference and the reference time of the first base station, where the at least one time difference includes the first time difference, and the first time difference is a time difference between the first base station and the second base station acquired by using active random access of the first user equipment UE. In a case in which at least two time differences are acquired, the acquired at least two time differences may be averaged, or two time differences with a minimum difference are averaged, or a largest value and a smallest value of the multiple time differences are removed and the remaining time differences are averaged. The time adjustment value of the second base station is acquired by using a time difference obtained through the averaging and the reference time of the first base station.

The adjustment value sending unit 1012 is configured to send the time adjustment value acquired by the time adjustment value processing unit 1011 to the second base station, so that the second base station performs time adjustment according to the time adjustment value. Optionally, before the time adjustment value is sent to the second base station, determining is performed to determine whether the second base station needs to perform time adjustment. If the second base station needs to perform time adjustment, the time adjustment value is sent to the second base station.

Optionally, the central controller further includes a time difference request unit 1013, configured to send a time difference request message to the first base station, so that the first base station acquires the first time difference between the first base station and the second base station by using active random access of the first user equipment UE. The time difference request message may be sent to the first base station periodically. The time difference request message may also be sent to the first base station when load of the first base station is lower than a load threshold according to a load status of the first base station.

Optionally, the central controller may further include an interface module 1012, configured to complete information exchange between the central controller and the base station.

Figure 11:
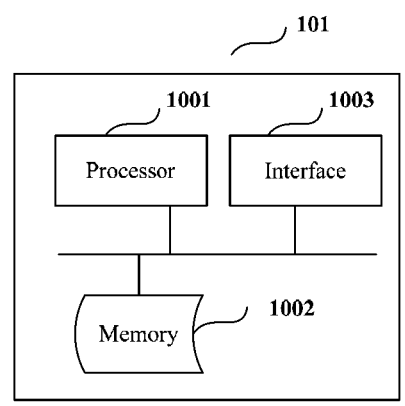
FIG. 11 is a schematic diagram of a central controller apparatus in air-interface-based synchronization according to an embodiment of the present disclosure.

FIG. 11 is a schematic apparatus diagram of a central controller in air-interface-based synchronization according to an embodiment of the present disclosure, including a processor 1001, a memory 1002, and an interface 1003, where the processor 1001, the memory 1002, and the interface 1003 are connected by using a bus.

The interface 1003 is configured to exchange information with a base station 102.

The memory 1002 is configured to store program code. The processor 1001 invokes the program code stored in the memory, so as to execute the central controller processing method in Embodiment 2.

Figure 12:
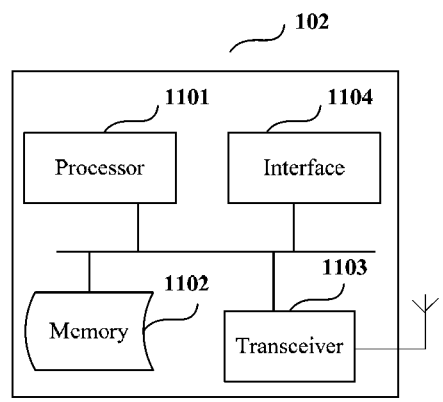
FIG. 12 is a schematic diagram of a base station apparatus in air-interface-based synchronization according to an embodiment of the present disclosure.

FIG. 12 is a schematic apparatus diagram of a first base station in air-interface-based synchronization according to an embodiment of the present disclosure, including a processor 1101, a memory 1102, a transceiver 1103, and an interface 1104, where the processor 1101, the memory 1102, the transceiver 1103, and the interface 1104 are connected by using a bus.

The interface 1104 is configured for information exchange between base stations or information exchange between a base station and a core network, or configured for information exchange with a central controller 101.

The transceiver 1103 is configured to exchange information with user equipment.

The memory 1102 is configured to store program code. The processor 1101 invokes the program code stored in the memory 1102, to execute the first base station processing method in Embodiment 2.

Figure 13:
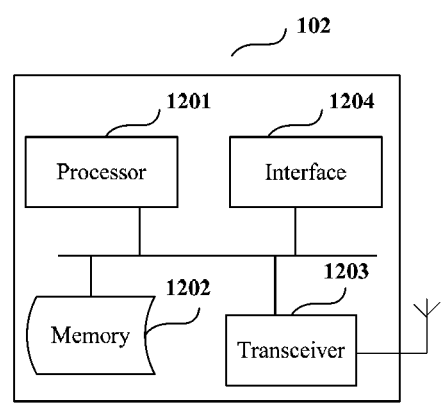
FIG. 13 is a schematic diagram of a base station apparatus in air-interface-based synchronization according to an embodiment of the present disclosure.

FIG. 13 is a schematic apparatus diagram of a second base station in air-interface-based synchronization according to an embodiment of the present disclosure, including a processor 1201, a memory 1202, a transceiver 1203, and an interface 1204, where the processor 1201, the memory 1202, the transceiver 1203, and the interface 1204 are connected by using a bus.

The interface 1204 is configured for information exchange between base stations or information exchange between a base station and a core network, or configured for information exchange with a central controller 101.

The transceiver 1203 is configured to exchange information with user equipment.

The memory 1202 is configured to store program code. The processor 1201 invokes the program code stored in the memory 1202, to execute the second base station processing method in Embodiment 2.

It may be understood that, according to active random access of the UE, the central controller may use the first base station to acquire the time difference between the first base station and the second base station, or may use the second base station to acquire the time difference between the first base station and the second base station, that is, the first base station and the second base station may be equivalent.

In this embodiment, a time difference between base stations is acquired by means of signaling interaction by using active random access of user equipment, and a time adjustment value of a non-reference base station is acquired according to reference time of a reference base station, so that the non-reference base station performs time adjustment according to the time adjustment value, to implement time synchronization between the non-reference base station and the reference base station, without a need of using an expensive synchronization device, thereby reducing construction and maintenance costs, and achieving a technical effect in an economic and convenient manner.

Embodiment 9

Figure 10:
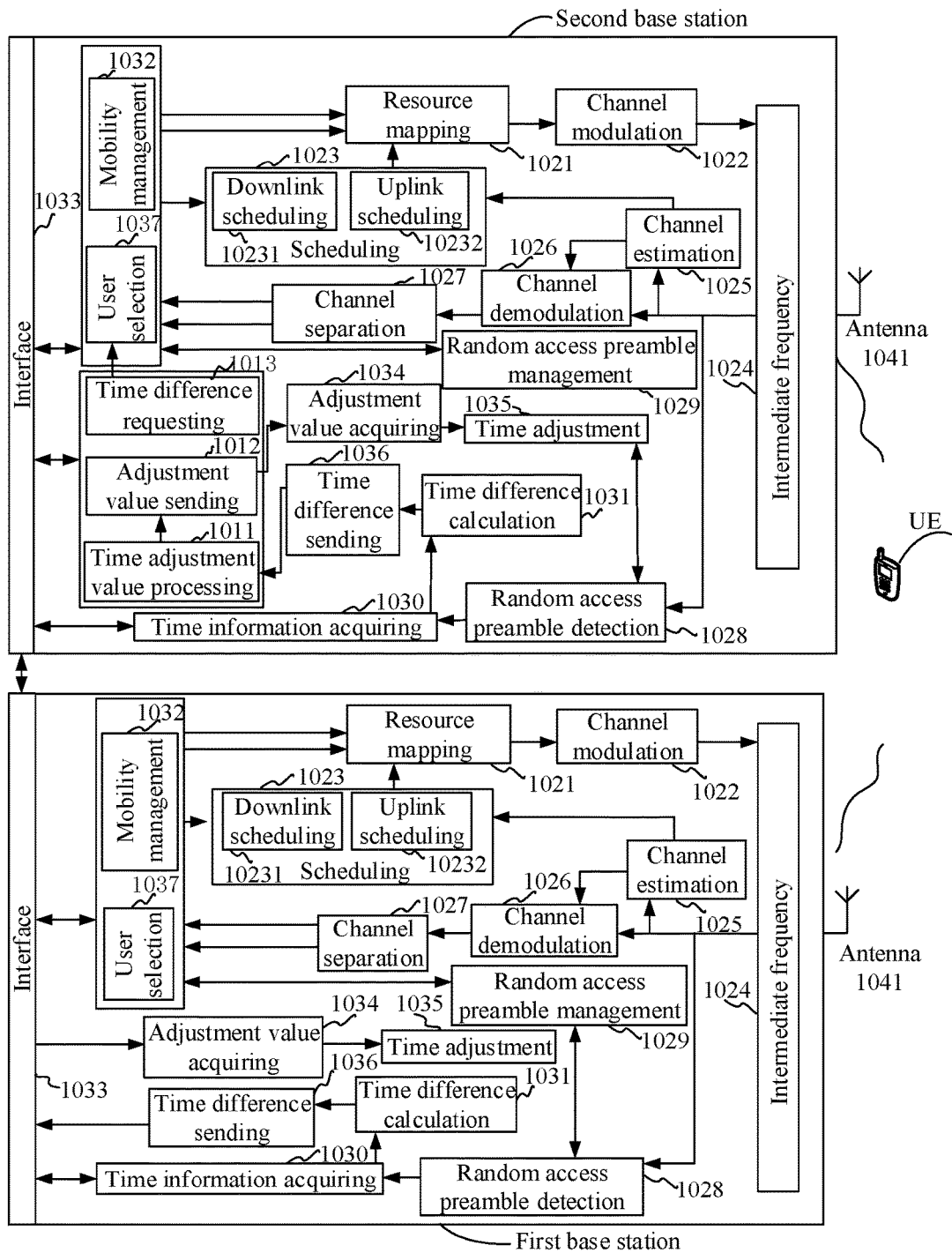
FIG. 10 is another schematic structural diagram of a base station that implements air-interface-based synchronization according to an embodiment of the present disclosure.

FIG. 10 is another schematic structural diagram of a base station that implements air-interface-based synchronization according to an embodiment of the present disclosure, including a first base station and a second base station. The second base station includes functions of a central controller in Embodiment 2. When a reference base station is the second base station, a non-reference base station is the first base station; or, when the reference base station is the first base station, the non-reference base station is the second base station.

The first base station is basically the same as that in Embodiment 8. Differences are that in this embodiment, a user selection unit 1037 receives a time difference request message from the second base station; and a time difference sending unit 1036 is configured to send a first time difference acquired by a time difference calculation unit 1031 to the second base station, so that the second base station acquires a time adjustment value of the non-reference base station according to at least one time difference that is acquired and reference time of the reference base station.

The first base station further includes an adjustment value acquiring unit 1034 and a time adjustment unit 1035.

The adjustment value acquiring unit 1034 is configured to: when the reference base station is the second base station, acquire the time adjustment value sent by the second base station.

The time adjustment unit 1035 is configured to perform time adjustment according to the time adjustment value acquired by the adjustment value acquiring unit 1034, to complete time synchronization.

The second base station includes a central controller in Embodiment 8. Therefore, the second base station includes a time difference request unit 1013, a time adjustment value processing unit 1011, and an adjustment value sending unit 1012.

The time difference request unit 1013 is configured to send a time difference request message to the first base station, so that the first base station acquires a first time difference between the first base station and the second base station by using active random access of a first UE. The time difference request message may be sent to the first base station periodically. The time difference request message may also be sent to the first base station when load of the first base station is lower than a load threshold according to a load status of the first base station.

The time adjustment value processing unit 1011 is configured to acquire a time adjustment value of the non-reference base station according to the acquired at least one time difference and the reference time of the reference base station, where the at least one time difference includes the first time difference, and the first time difference is a time difference between the first base station and the second base station acquired by using active random access of the first UE.

The adjustment value sending unit 1012 is configured to send the time adjustment value acquired by the time adjustment value processing unit 1011 to the non-reference base station.

Optionally, the second base station further includes a random access preamble management unit 1029, a random access preamble detection unit 1028, and a time information acquiring unit 1030, which are the same as the corresponding units of the second base station in Embodiment 8.

Optionally, the second base station further includes an adjustment value acquiring unit 1034 and a time adjustment unit 1035.

The adjustment value acquiring unit 1034 is configured to: when the first base station is the reference base station, acquire the time adjustment value sent by the adjustment value sending unit 1012. The time adjustment unit 1035 is configured to perform time adjustment according to the time adjustment value acquired by the adjustment value acquiring unit 1034, to complete time synchronization.

It may be understood that in this embodiment, the second base station may also select UE according to the time difference request message, and acquire the time difference between the first base station and the second base station by using active random access of the UE. That is, after the foregoing time difference request unit 1013, time adjustment value processing unit 1011, and adjustment value sending unit 1012 of the second base station are excluded, the first base station and the second base station may be equivalent.

Figure 14:
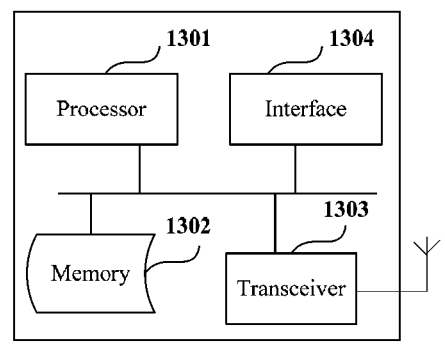
FIG. 14 is another schematic diagram of a base station apparatus that implements air-interface-based synchronization according to an embodiment of the present disclosure.

FIG. 14 is another schematic apparatus diagram of a first base station according to an embodiment of the present disclosure, including a processor 1301, a memory 1302, a transceiver 1303, and an interface 1304, where the processor 1301, the memory 1302, the transceiver 1303, and the interface 1304 are connected by using a bus.

The interface 1304 is configured for information exchange between base stations or information exchange between a base station and a core network.

The transceiver 1303 is configured to exchange information with user equipment.

The memory 1302 is configured to store program code. The processor 1301 invokes the program code stored in the memory 1302, so as to execute the first base station processing method in Embodiment 5.

Figure 15:
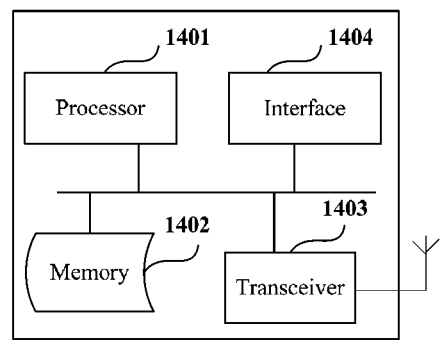
FIG. 15 is another schematic diagram of a base station apparatus that implements air-interface-based synchronization according to an embodiment of the present disclosure.

FIG. 15 is another schematic apparatus diagram of a second base station according to an embodiment of the present disclosure, including a processor 1401, a memory 1402, a transceiver 1403, and an interface 1404, where the processor 1401, the memory 1402, the transceiver 1403, and the interface 1404 are connected by using a bus.

The interface 1404 is configured for information exchange between base stations or information exchange between a base station and a core network.

The transceiver 1403 is configured to exchange information with user equipment.

The memory 1402 is configured to store program code. The processor 1401 invokes the program code stored in the memory 1402, so as to execute the second base station processing method in Embodiment 5.

In this embodiment, a time difference between base stations is acquired by means of signaling interaction by using active random access of user equipment, and a time adjustment value of a non-reference base station is acquired according to reference time of a reference base station, so that the non-reference base station performs time adjustment according to the time adjustment value, to implement time synchronization between the non-reference base station and the reference base station, without a need of using an expensive synchronization device, thereby reducing construction and maintenance costs, and achieving a technical effect in an economic and convenient manner.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. An air-interface-based synchronization method for synchronizing first and second base stations, where the first base station is a reference base station and the second base station is a non-reference base station, the method comprising:
sending, by the central controller, a time difference request message to a first base station, where the message is periodically sent or sent when a load of the first base station is lower than a load threshold;
acquiring, by a central controller, at least one time difference from the first base station;
acquiring a time adjustment value of a second base station based on the at least one time difference and a reference time of the first base station,
wherein the at least one time difference (a) comprises a first time difference between a first receiving moment of the first base station and a second receiving moment of the second base station and (b) is acquired by using active random access of a first user equipment (UE); and
sending, by the central controller, the time adjustment value to the second base station for use by the second base station to perform time adjustment.

2. The air-interface-based synchronization method according to claim 1, wherein acquiring the time adjustment value of the second base station comprises:
when the central controller acquires at least two time differences, averaging, by the central controller, the at least two time differences, to obtain an averaged time difference; or
averaging the at least two time differences with a minimum difference, to obtain an averaged time difference; and
acquiring by the central controller, the time adjustment value of the second base station based on the averaged time difference and the reference time of the first base station.

3. The air-interface-based synchronization method according to claim 1, wherein sending the time adjustment value to the second base station comprises:
determining, by the central controller, based on the time adjustment value, whether the second base station needs to perform the time adjustment; and
when the central controller determines that the second base station needs to perform the time adjustment, sending, by the central controller, the time adjustment value to the second base station.

4. The air-interface-based synchronization method according to claim 1, wherein the acquiring, by the central controller, the time adjustment value of the second base station comprises:
when the central controller acquires at least three time differences, removing two of the at least three time differences each of which respectively has a largest value and a smallest value, and averaging the remaining time differences, to obtain an averaged time difference; and
acquiring by the central controller, the time adjustment value of the second base station based on the averaged time difference and the reference time of the first base station.

5. The air-interface-based synchronization method according to claim 1, wherein the sending, by the central controller, the time difference request message to the first base station comprises:
when a load of the first base station is lower than a load threshold, periodically sending, by the central controller, the time difference request message to the first base station.

6. A central controller comprising:
an interface configured to exchange information with one or more base stations;
a processor configured to acquire at least one time difference in response to sending a time difference request message through the interface to a first base station, where the time difference request message is periodically sent to the first base station or sent when a load of the first base station is lower than a load threshold;
acquire a time adjustment value of a second base station based on the at least one time difference and reference time of the first base station,
wherein the at least one time difference (a) comprises a first time difference between a first receiving moment of the first base station and a second receiving moment of the second base station and (b) is acquired by using active random access of a first user equipment (UE), and the first and second base stations are reference and non-reference base stations, respectively; and
the processor further configured to send the time adjustment value through the interface to the second base station for use by the second base station to perform time adjustment.

7. The central controller according to claim 6, wherein the processor is configured to:
when at least two time differences are acquired, average the at least two time differences, to obtain an averaged time difference; or average the at least two time differences with a minimum difference, to obtain an averaged time difference; and
acquire the time adjustment value of the second base station based on the averaged time difference and the reference time of the first base station.

8. The central controller according to claim 6, wherein the processor is configured to:
determine, based on the time adjustment value, whether the second base station needs to perform the time adjustment; and
when the processor determines that the second base station needs to perform the time adjustment, send the time adjustment value through the interface to the second base station.

9. The central controller according to claim 6, wherein the processor is configured to:
when at least three time differences are acquired, remove two of the at least three time differences each of which respectively has a largest value and a smallest value, and average the remaining time differences; and
acquire the time adjustment value of the second base station based on the averaged time difference and the reference time of the first base station.

10. A base station, which serves as a first base station, comprising:

an interface configured to exchange information with a central controller;

a processor configured to select a first user equipment (UE) after receiving a time difference request message sent by the central controller select the first UE when a difference between downlink signal strength of the first base station measured by the first UE and downlink signal strength of the second base station measured by the first UE is lower than a threshold;

acquire, based on the selected first UE, a first time difference between a first receiving moment of the first base station and a second receiving moment of a second base station by using active random access of the first UE; and send the acquired first time difference through the interface to the central controller, to enable the central controller to acquire a time adjustment value of the second base station based on at least one time difference that is acquired and a reference time of the first base station, wherein the at least one time difference comprises the first time difference, the first base station is a reference base station, and the second base station is a non-reference base station.

11. The base station according to claim 10, wherein the processor is configured to:

allocate a first random access preamble to the first UE, to enable the first UE to initiate the active random access to the first base station by using the first random access preamble, and send the first random access preamble to the second base station, to enable the second base station to start random access preamble detection after acquiring the first random access preamble, wherein the first random access preamble is a non-contention based random access preamble;

receive an acknowledgement message of successful start of the random access preamble detection sent by the second base station;

detect the first random access preamble used by the first UE to initiate the active random access, and acquire a moment of the detection as the first receiving moment;

acquire the second receiving moment, which is a moment when the second base station detects the first random access preamble; and obtain the first time difference based on the first receiving moment and the second receiving moment.

12. The base station according to claim 11, wherein the processor is configured to:

after receiving the acknowledgement message of the successful start of the random access preamble detection sent by the second base station, trigger the first UE to initiate the active random access to the first base station by using the first random access preamble.

13. The base station according to claim 12, wherein the processor is configured to:

send a physical downlink control channel order (PDCCH Order) to the first UE, wherein the PDCCH Order carries an index of the first random access preamble, to enable the first UE to initiate the active random access to the first base station according to the first random access preamble after receiving the PDCCH Order.

14. The base station according to claim 11, wherein the processor is configured to:

obtain the first time difference based on the following:

First time difference=(Second receiving moment−First receiving moment).

15. The base station according to claim 11, wherein the processor is configured to:

obtain the first time difference based on the following:

First time difference=(First receiving moment−Second receiving moment).

* * * * *